United States Patent

Waiters

[11] 4,060,293
[45] Nov. 29, 1977

[54] PROTECTIVE DEVICE

[76] Inventor: Irene Waiters, 780 Barry Place, Uniondale, N.Y. 11553

[21] Appl. No.: 677,045

[22] Filed: Apr. 14, 1976

[51] Int. Cl.² .............. A47B 81/00; A61G 11/00; A47B 97/00; A47G 19/26
[52] U.S. Cl. .......................................... 312/284; 312/1
[58] Field of Search ............... 312/1, 284, 107, 111, 312/137, 133, 43, 281; 135/5

[56] References Cited

U.S. PATENT DOCUMENTS

| 143,611 | 10/1873 | Boyer | 312/284 |
|---|---|---|---|
| 262,512 | 8/1882 | Toutant | 312/284 |
| 996,636 | 7/1911 | Gabriel | 312/107 |
| 1,688,407 | 10/1928 | Wastak | 312/107 |
| 1,929,139 | 10/1933 | Eisenhauer | 312/284 |
| 2,014,133 | 9/1935 | Hurley, Jr. | 312/284 |
| 2,233,003 | 2/1941 | Epps | 312/107 |
| 2,853,350 | 9/1958 | Mandel | 312/107 |
| 3,020,113 | 2/1962 | Molitor | 312/284 |
| 3,241,706 | 3/1966 | Monaco et al. | 312/284 |

*Primary Examiner*—Paul R. Gilliam
*Assistant Examiner*—Victor N. Sakran
*Attorney, Agent, or Firm*—Robert D. Farkas

[57] ABSTRACT

A device that is adapted to protect one from the irritating emission produced when peeling onions and the like; the device permits the peeling operation to be carried out under a transparent shield.

5 Claims, 4 Drawing Figures

U.S. Patent  Nov. 29, 1977  4,060,293

PROTECTIVE DEVICE

BACKGROUND OF THE INVENTION

This invention relates to a protective device especially adapted to shield an onion peeler during the peeling operation from the irritating emission of the onion. More particularly, to a transparent table top device that permits working with the hands to be carried out thereunder.

The prior art teaches a variety of devices adapted for the covering of food, however, they fail to provide a device whereby working with the food may be carried thereunder, such as to protect ones eyes and nose therefrom.

SUMMARY OF THE INVENTION

It is accordingly an object of the instant invention to provide for an improved device for the covering of food.

It is another object to provide for a device that will not only cover the food but enable one to work with the same while it is covered.

It is a further object to provide for the same at relatively little cost thereby making it generally available.

Figure 1:
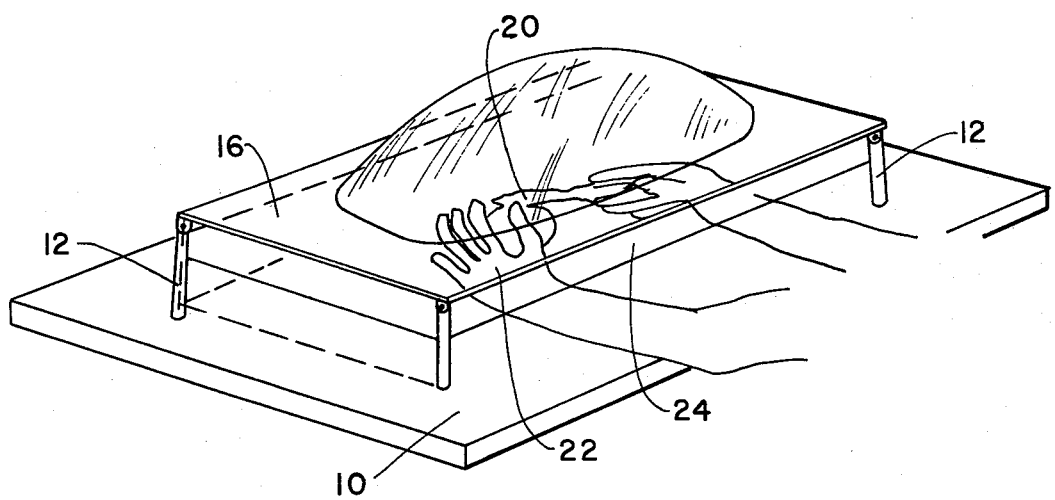
Figure 2:
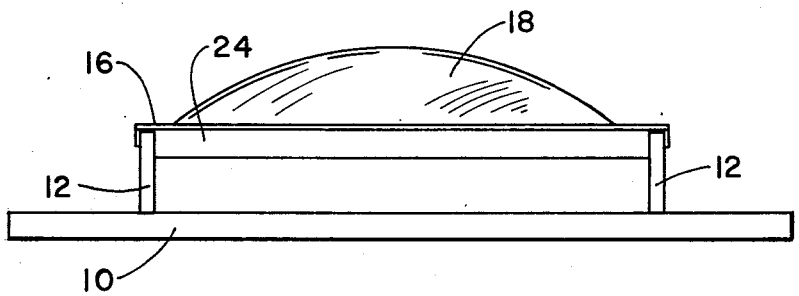
Figure 3:
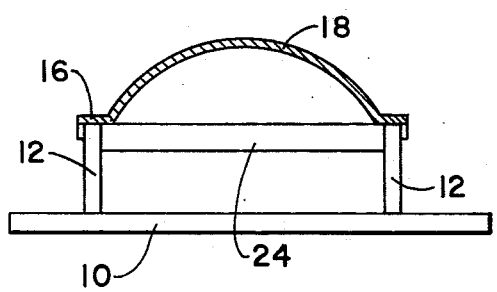
Figure 4:
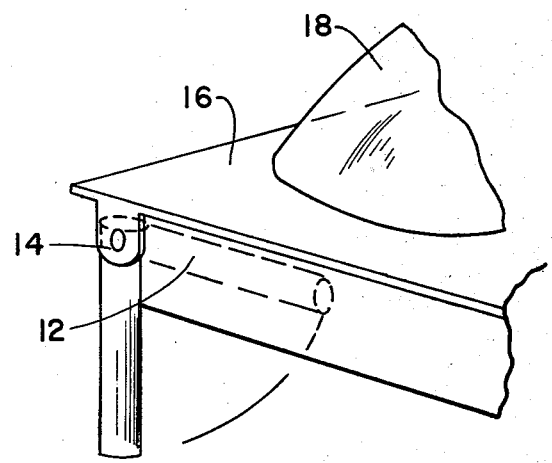

These and other objects and advantages of the invention will become more apparent from the following detailed disclosure and claims and by reference to the accompanying drawings, in which:

FIG. 1 is a perspective view;
FIG. 2 is a front elevational view;
FIG. 3 is a rear elevational view; and
FIG. 4 is a side elevational fragmentary perspective view.

Broadly speaking, the instant invention includes the provision of a protective device especially adapted for use when working with sensory irritating items, comprising a cover member having a substantially centrally disposed transparent bubble portion and at least two support members disposed substantially perpendicular to the cover member and integral therewith.

DETAILED DISCLOSURE

Referring more particularly to the drawings there is shown a support surface 10 such as a table or counter top that is adapted to support the present device. The device comprises a structure that includes a plurality for support members 12 such as four vertical leg parts or two side walls that are adapted to maintain it in the upright position. In the preferred embodiment the support member 12 will be pivotable such that they fold between an extended position substantially vertical to the structure whereby they support it and a collapsed position lying in substantially the same plane as the structure whereby they do not support it. Suitable pivot means 14 such as hinge or the like are in communication between the structure and the members 12.

Integral with the members 12 there is a substantially horizontal cover member 16 that includes a centrally disposed bubble or convex portion 18 that is transparent. The bubble portion 18 may be unitary with the cover member 16 if desired. Working with the object 20, such as the onion is carried out with the hands 22 beneath the bubble portion 18.

In the preferred embodiment the cover member 16 will be integral with at least one side wall member 24 that is disposed such that it does not reach the support surface 10 yet does form a partial wall that will permit introduction of the hands 22 thereunder such that the working may be carried out. If desired, an opposing wall that is parallel thereto may be present, or be only another partial wall as is wall member 24. If desired, full or partial pair of side walls may be disposed perpendicular thereto. Where full walls, they will pivot upward and from the support legs 12, where only partial, they will be integral with the leg members 12 and still pivot upward therewith.

Since it is obvious that numerous changes and modifications can be made in the above described details without departing from the spirit and nature of the invention, it is to be understood that all such changes and modifications are included within the scope of the invention.

I claim:

1. A protective device especially adapted for use when working with sensory irritating foodstuff items, comprising a cover member having a substantially centrally disposed transparent bubble portion and at least two support members disposed substantially perpendicular to said cover member and integral therewith, said at least two support members pivotably secured to said cover member, said support members pivot between substantially vertical use and horizontal storage positions relative to said cover member, whereby said support members when in said substantially vertical use position provide vertical support of said cover member above a work surface for said sensory irritating items.

2. The device as defined in claim 1 wherein said support members are legs.

3. The device as defined in claim 1 wherein said support members are a pair of first and second opposing parallel side members.

4. The device as defined in claim 3 further including a third side wall member perpendicularly adjacent said first and second members.

5. The device as defined in claim 1 wherein said bubble portion and said cover portion are unitary.

* * * * *